FIG. 1

INVENTORS
HAROLD L. EHLERS
ANDREW A. FRANK
BY  RONALD O. ROGERS

ATTORNEY

United States Patent Office 3,175,786
Patented Mar. 30, 1965

3,175,786
HELICOPTER FLIGHT CONTROL SYSTEM
Andrew Alfonso Frank, Long Beach, Harold L. Ehlers, Whittier, and Ronald O. Rogers, La Mirada, Calif., assignors to North American Aviation, Inc.
Filed Feb. 20, 1962, Ser. No. 174,526
12 Claims. (Cl. 244—17.13)

The subject invention relates to an automatic flight control system for helicopter type vehicles and more particularly to a simplified three axis attitude and trim control system including two-axis stabilization for single lift rotor type helicopters.

The utility of an aircraft having vertical take-off and hovering capabilities has led to the development of helicopter type aircraft, variously known as rotary-wing aircraft, which are characterized by rotors or sets of rotary blades which are made to rotate about a nominal vertical axis (lying within the aircraft plane of symmetry) to provide a lifting force. In a simple inexpensive class of helicopter, only a single such lifting rotor is employed.

Control of the direction of the lift vector is effected by attitude controls called cyclic controls which tilt a swash plate or universal transmission joint between the rotor drive shaft and the hub of the rotor itself, to provide pitch and roll component tilts to the swash plate. Forward flight is effected by tilting the rotor blades slightly in pitch in order to obtain a forward acceleration component of the vertical lift vector. Maneuvering (e.g., a forward flight path having a yaw rate) is accomplished by providing a combination pitch and roll tilt of the main rotor swash plate. Hovering is accomplished by maintaining zero pitch and roll tilt angles of the main rotor swash plate relative to the main rotor drive shaft.

Due to the rotation of the main rotor, a reaction moment is induced upon the airframe, which tends to cause a yaw velocity about the main rotor drive shaft. In practice, such yawing moment is counterbalanced or opposed by an auxiliary rotor mounted aft of, and rotating in a plane perpendicular to nominal plane of rotation of the main rotor, the direction of rotation and speed of the auxiliary rotor being selected so as to overcome the tendency of the vehicle to rotate about the main rotor drive shaft. Control of yaw is then effected by controlling the cumulative pitch of the auxiliary rotor.

Such two-rotor helicopters provide simple and inexpensive flying vehicles having vertical take-off and hovering capabilities. In the commercial design of such vehicles, the size of the main rotor is limited to within a narrow range for several reasons. If the rotor is too small, then rotor damping (e.g., aerodynamic damping of the rotor) decreases drastically, thereby adversely affecting the stability of the direction of the lift vector. If the rotor is too big, then the structural integrity of the rotor blades themselves is adversely affected.

Further, the basic dynamic response of such a single main-rotor type helicopter is inherently unstable (e.g., the vehicle-motion transfer function in roll and pitch characteristically includes a pair of complex conjugate roots having a very poor or even a negative damping ratio). However, because of (1) this inherent instability, and (2) the limited range of vehicle instabilities with which a human pilot can cope, the art is necessarily constrained to design such vehicles to a common design specification. Therefore, the dynamic flight properties of such a vehicle lie within a small region. Further, because of the narrow range of rotor sizes, the static gains of flight performance for this class of vehicle also lie within a small region. Accordingly, the automatic control problem for this class of vehicle can be shown to be relatively determinate.

The specification for commercial helicopters has been concerned with requiring that the frequency or size of the unstable roots of the helicopters transfer function lie within a region of frequencies with which the human pilot can cope, namely the region between 0 and 3 radians per second. Such requirement stems from several considerations: (1) pilot fatigue or endurance limits, as well as the upper limit of pilot ability to control an inherently unstable vehicle, (2) inability of prior art flight stabilization systems to completely stablize such class of helicopters (e.g., such systems only reduced, not removed, the main cause of pilot fatigue), and (3) fail-safety considerations of providing a vehicle capable of human control in the event of a failure or malfunction of the flight control system.

The prior art flight stabilization means, using attitude rate feedback, have only reduced the size or frequency of the unstable roots of the vehicle motion transfer function. However, the gain region in which such low frequency mode performance may be thus modified is limited by the upper gain limit at which a high frequency mode becomes intolerably unstable. In other words, at higher gains a second response mode becomes unstable at a frequency beyond the ability of a human pilot to cope.

Further, even if effective means for improved automatic stabilization and attitude control of such vehicles can be achieved within such limited gain region, such means must be relatively simple and reliable and of small bulk and low unit cost to be particularly useful to such a class of vehicles.

In a preferred embodiment, the device of the subject comprises a helicopter flight control system providing two axis stabilization (e.g., pitch and roll stabilization) and three axis attitude control (e.g., pitch, roll and yaw control), including a cyclic control column connected in series mechanical connection with a roll and a pitch actuator adapted for roll and pitch tilting respectively of a helicopter main rotor swash plate, each said series mechanical connection including a trim position reference device operable by means of a trim switch mounted upon the cyclic control column, and a dual-action preloaded position-to-force transducer or bungee interposed between each said trim reference device and said cyclic control column, the preload or break-out force of said bungee being greater than the force required to move the swash plate controls. Further, the authority of each actuator is limited relative to the freedom of motion of the cyclic control column and the swash plate cyclic controls.

There is also provided a vertical sensor having a pitch and roll output for providing pitch and roll signals indicative of the pitch and roll attitude respectively of the helicopter employing such system, and a directional sensor for providing heading signals indicative of the azimuth heading of such helicopter. First and second rate-signal deriving means are responsively connected to the pitch and roll outputs respectively of the vertical sensor for providing pitch rate and roll rate signals respectively.

There is further provided first and second lag-lead circuits responsively connected to the first and second rate-signal deriving means respectively, each said circuit having a lag time constant of at least 10 seconds and a lead time constant having a magnitude no more than one-sixth that of the lag time constant. A first signal summing means is responsively connected to the first lag-lead circuit and the pitch output of the vertical sensor; and a second signal summing means is responsively connected to the second lag-lead circuit, the roll output of the vertical sensor, and the directional sensor. The pitch and roll actuators are responsively connected to the first and second signal summing means respectively.

There is further provided limiting means for limiting the effect of the lag time constant of each lag-lead circuit, thus providing synchronization of an associated one of the actuators; and a push-button type trim switch adapted to be mounted upon the cyclic control column and being commonly connected in series electrical circuit each trim position device.

In normal operation, equalized attitude rate signals are fed to the actuators for effecting combined pitch and roll attitude stabilization of the helicopter, while the attitude control signals added at the signal summing means through suitable switches provide automatic pitch and roll and yaw attitude control of the stabilized helicopter.

In normal operation an actuator output moves the main rotor swash plate to a reference position relative to the bungee-restrained cyclic control column. The break-out force of the bungee being greater than the required swash plate actuating force provided by the actuator, the bungee appears to the actuator as a rigid link between the actuator and the trim reference device. However, the linkage ratio between the control column and the bungee provides adequate mechanical advantage for a human pilot to move the control column against the bungee, thereby moving the swash plate by means of the interconnecting series actuator to effect aircraft maneuvers. By means of actuating the trim control button on the control column, the pilot may free the bungee from the trim reference device to establish a new trim position, re-engaging the trim position device at that position by releasing the trim button.

The closed loop flight stabilization in roll and pitch comprises equalized roll rate and pitch rate signal means respectively connected to the roll and pitch actuators respectively, equalization of each of the rate signals being effected by means of a lag-lead network, including signal-limiting means to provide a memory-function during forward flight maneuvers. Because the authority of the actuators is limited relative to the freedom of motion of the cyclic control column and the swash plate, an affected stabilization loop will be over-ridden by the pilot during a pilot-induced attitude maneuver. Because of the memory function provided during saturation of the stabilization loops, simple yet effective means is employed to assure synchronization of the actuator with the stabilization mode control signals during such pilot-induced maneuvers. Further, such limiter, in limiting the effect of the lag time constant of an associated lag-lead circuit, provides improved vehicle attitude response to gusts or disturbances to the vehicle attitude immediately subsequent to said maneuvers.

Yaw stabilization may be added by providing a yaw actuator for driving the cumulative controls of the auxiliary rotor, the yaw actuator being responsively coupled to the directional sensor by means of a rate circuit.

Accordingly, it is a general object of the subject invention to provide improved attitude stabilization of a helicopter.

It is an object of the subject invention to provide attitude stabilization of a helicopter by means of improved attitude rate compensation.

It is another object of the subject invention to provide simple and effective means for combining manual control modes including stick trim with automatic flight stabilization modes of operation of a helicopter.

It is still another object of the subject invention to provide a simple three axis helicopter attitude controller having a minimum number of components, maximum reliability, and which is fail-safe.

It is a further object of this invention to provide a reliable three axis helicopter attitude controller that is relatively easy to operate and adjust.

It is yet a further object of this invention to provide improved positive damping of the roll and pitch motion modes of a helicopter having a single main rotor.

These and other objects of the invention will become apparent from the following description taken in connection with the accompanying drawings in which.

In the figures like reference characters refer to like parts.

The dynamic attitude stability of a helicopter employing attitude-rate feedback signals to the controls may be investigated as a function of the gain of the controls, by using servo analysis techniques. The root locus method is one such servo analysis technique described, for example, in "Control System Dynamics," McGraw-Hill (1954). Such method provides means for investigating the poles of the characteristic equation (e.g., the denominator roots) of a closed-loop transfer function. The variation of these roots may be thus investigated for a given open-loop transfer function as a function of the open-loop gain. In other words, for a given set of open-loop poles and zeroes, the manner of migration of the closed-loop poles from the open-loop poles to the open-loop zeroes may be observed. A root locus diagram of the high frequency pitching modes of a rate-stabilized helicopter is shown in FIG. 1 for a representative flight condition.

Figure 1:
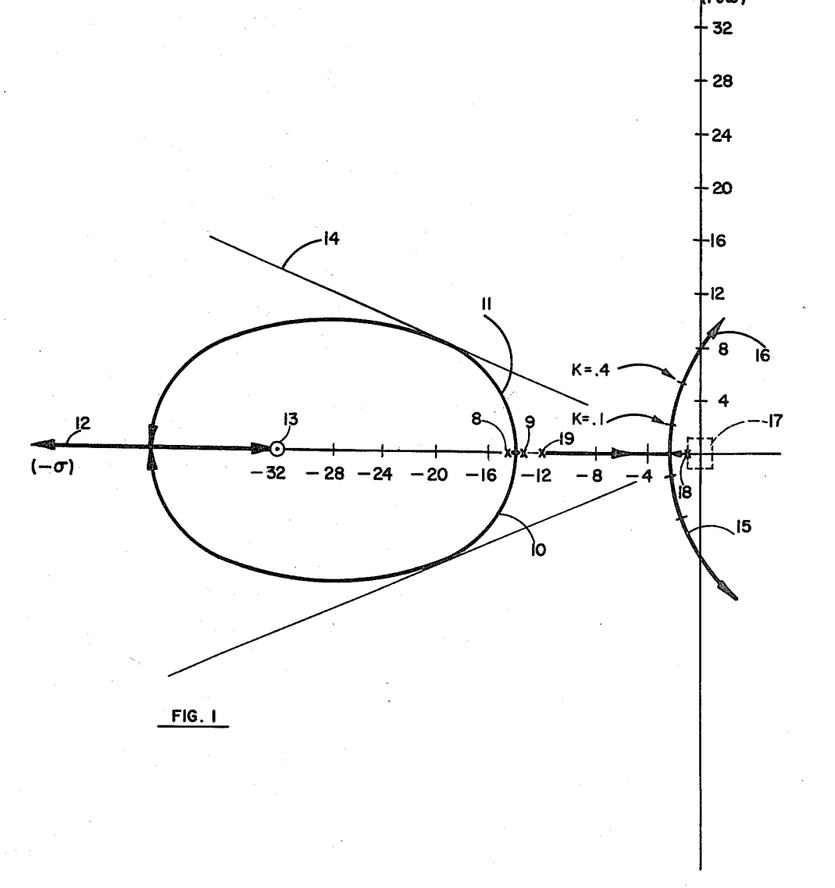
FIGS. 1 and 2 are root loci diagram of the longitudinal equations of motion of an exemplary rate stabilized helicopter of the class described, in forward flight, showing the effects of increased forward-loop gain without application of this invention.

Referring to FIG. 1, there is illustrated a diagram of the locus of roots for the high frequency mode of the closed-loop equations of pitch motion of a conventional pitch-rate-stabilized single-main-rotor type helicopter, as a function of the forward loop gain. The open-loop zeroes or numerators of the open-loop system are indicated by ⊙ symbols, and the poles or denominator roots are indicated by X-symbols. Included in the poles depicted in FIG. 1 are the dynamics (e.g., roots 8 and 9) of a representative actuator system, approximated as a critically-damped second order dynamic element, having a natural frequency of about 14 radians per second (or higher). The rest of the roots indicated are the roots of the equations of motion for the representative airframe.

It is to be observed that the branches 10 and 11 of the locus originating at the two poles 8 and 9 near −14 radians/second terminate at minus infinity (designated by branch 12) and at an open-loop zero 13 lying in the left half plane of the root locus diagram (e.g., to the left of the origin). Since branches 10 and 11 are seen to lie in the left half plane for all values of gain, and demonstrate reasonable good damping for even the lowest damped gain condition of such branches (indicated by the low slope of tangent 14 drawn tangent to the locus from the origin) these branches are of no consideration to the stability problem.

However, branches 15 and 16, originating at the remaining poles 18 and 19 of the helicopter transfer function, demonstrate an oscillatory mode as the gain increases, as indicated by the divergence of the locus branches 15 and 16 from the axis of reals (e.g., moving below and above the ordinate respectively. In fact, as the gain K is increased from 0.1 to 0.4, the frequency or size of the oscillatory root pair is seen to increase, while the damping decreases, the pair becoming unstable (e.g., crossing over into the right half plane) at a frequency of about 8 radians per second. Further, the unstable region is seen to increase above such 8 radians per second, representing a frequency region well beyond the 0–3 radian per second region within which a human pilot can cope with an unstable mode. Accordingly, a maximum gain K of about 0.1 is to be preferred to limit the frequency of the lightly damped oscillatory mode of locus branches 15 and 16 to a frequency within the 3 radian/second limit and having resonable damping.

Figure 2:
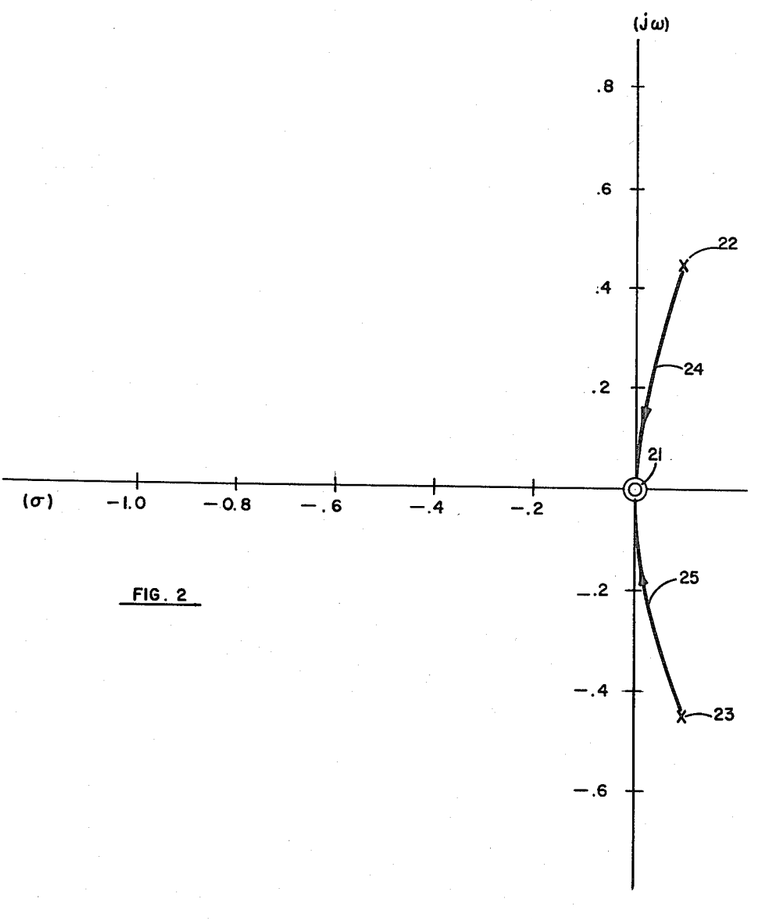

The long-period or low frequency roots of the helicopter pitch equations of motion lie within the area 17 of FIG. 1 and are more easily seen by means of the expanded scale diagram of FIG. 2.

Referring to FIG. 2, there is illustrated a diagram of the locus of roots for the low-frequency mode of the closed-loop equations of pitch motion of the exemplary pitch-rate stabilized helicopter illustrated in FIG. 1. The exemplary open-loop low frequency roots are illustrated as a double zero 21 at the origin, and a pair of complex conjugate poles 22 and 23, having negative damping. The complex conjugate aspect is indicated by the fact that the pair lie above and below the axis of reals, while the negative damping characteristic is indicated by the location of the pair in the right half plane (e.g., to the right of the origin and axis of imaginaries). The two branches 24 and 25 of the low frequency locus of the closed-loop poles or denominator roots are illustrated as originating at the open loop poles and migrating toward the double open-loop zero 21 as the system gain is increased. However, it is to be observed that the effect of increasing such gain only reduces the magnitude of such roots (e.g., reduces the natural frequency of such oscillatory mode), but does not substantially affect the damping thereof. Further, because of the upper limits of such gain, imposed by the high frequency modes illustrated in FIG. 1, the extent to which the low frequency mode can be reduced by increased system gain is also restricted. Therefore, the closed-loop rate-stabilized helicopter system without application of the invention represented by FIGS. 1 and 2 represents a system having poor dynamic response, and requiring much effort by a skilled pilot for adequate flight path stabilization.

Figure 3:
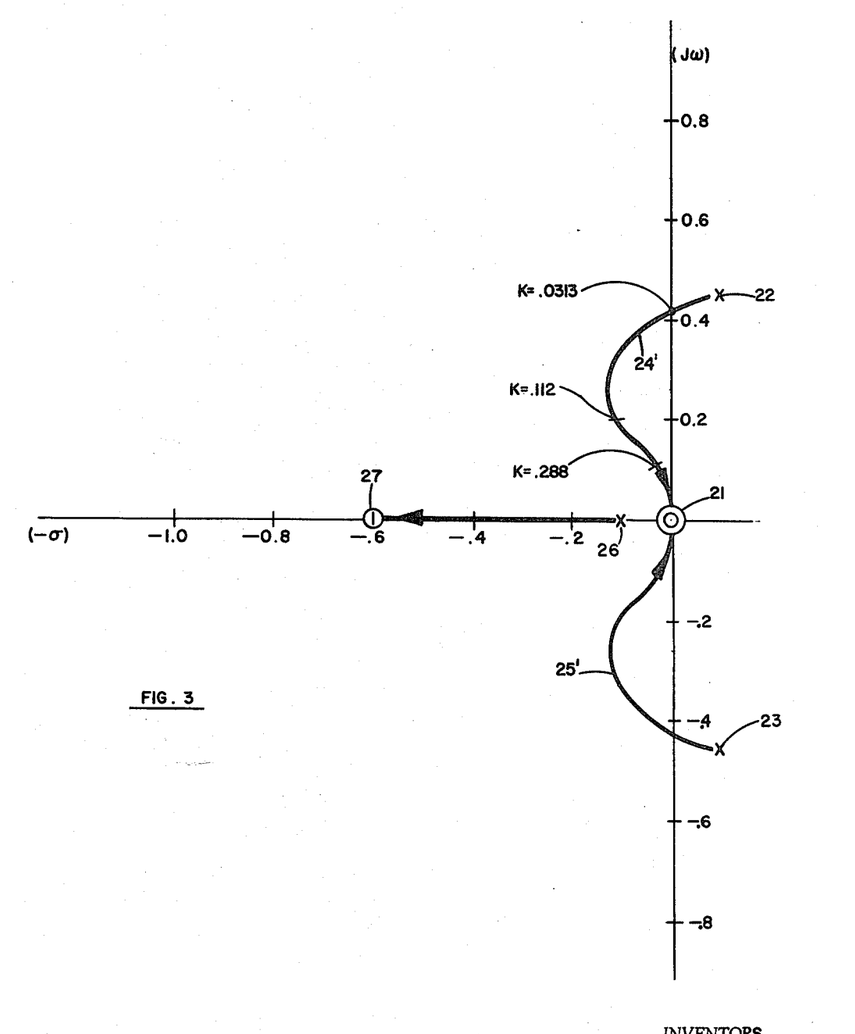
FIG. 3 is a root-locus diagram of the low-frequency mode of the longitudinal equations of motion of an exemplary helicopter of the class described, in forward flight, and including the novel compensated attitude rate-stabilization concept of the subject invention.

It has been discovered that the attitude stabilization of a helicopter having a single main rotor may be substantially improved by combining lag-lead signal-shaping with the rate-stabilization feedback signal, as illustrated in FIG. 3.

Referring to FIG. 3, there is illustrated a root locus diagram of the low frequency modes of exemplary system of FIG. 2 and including the novel compensation concept of the invention. To the double zero 21 and the poles 22 and 23 of FIG. 2 has been added a pole 26 at .10 radian/second (e.g., a lag time constant of 10 seconds) and a zero 27 at .6 radian/sec, the roots 26 and 27 representing low frequency lag-lead signal provided by the certain novel combination of this invention. Because the signal-shaping occurs at low frequencies (e.g., entirely within area 17 of FIG. 1), the combined effect of roots 26 and 27 does not change the high frequency closed loop modes of FIG. 1, but instead is mutually cancelling at such high frequency. Accordingly, FIG. 1 illustrates the high frequency modes associated with the low frequency modes of either of FIGS. 2 and 3.

The effect of the addition of roots 26 and 27 is twofold. First, the negatively damped low frequency branches 24 and 25 of FIG. 2 are changed as illustrated in FIG. 3 by branches 24′ and 25′ to demonstrate an oscillatory mode having improved negative damping at gains above $K=.0313$, maximum damping occurring in the gain region, $.112 < K < .288$. This gain region is seen to lie within the gain region $.1 < K < .4$ illustrated on the high frequency branches 15 and 16 of FIG. 1, as to represent therefore, an optimum gain which provides both good high frequency mode response and good low frequency mode response.

The second effect of the addition of roots 26 and 27 of FIG. 3 is the creation of a branch which originates at pole 26 and terminates at zero 27. Because of the proximity of zero 27 to pole 26, such roots are essentially compensatory or self-cancelling, as to thus explain their lack of effect upon the high frequency modes of FIG. 1.

An investigation of the dynamics of many of the available single-main-rotor helicopters manufactured has indicated that an attitude-rate stabilization employing a lag-time constant of at least 10 seconds and a lead time constant of no more than one-sixth the magnitude of the lag time constant is required for either pitch or roll attitude stabilization, in order to achieve the advantages of improved handling qualities and reduced pilot-fatigue.

Figure 4:
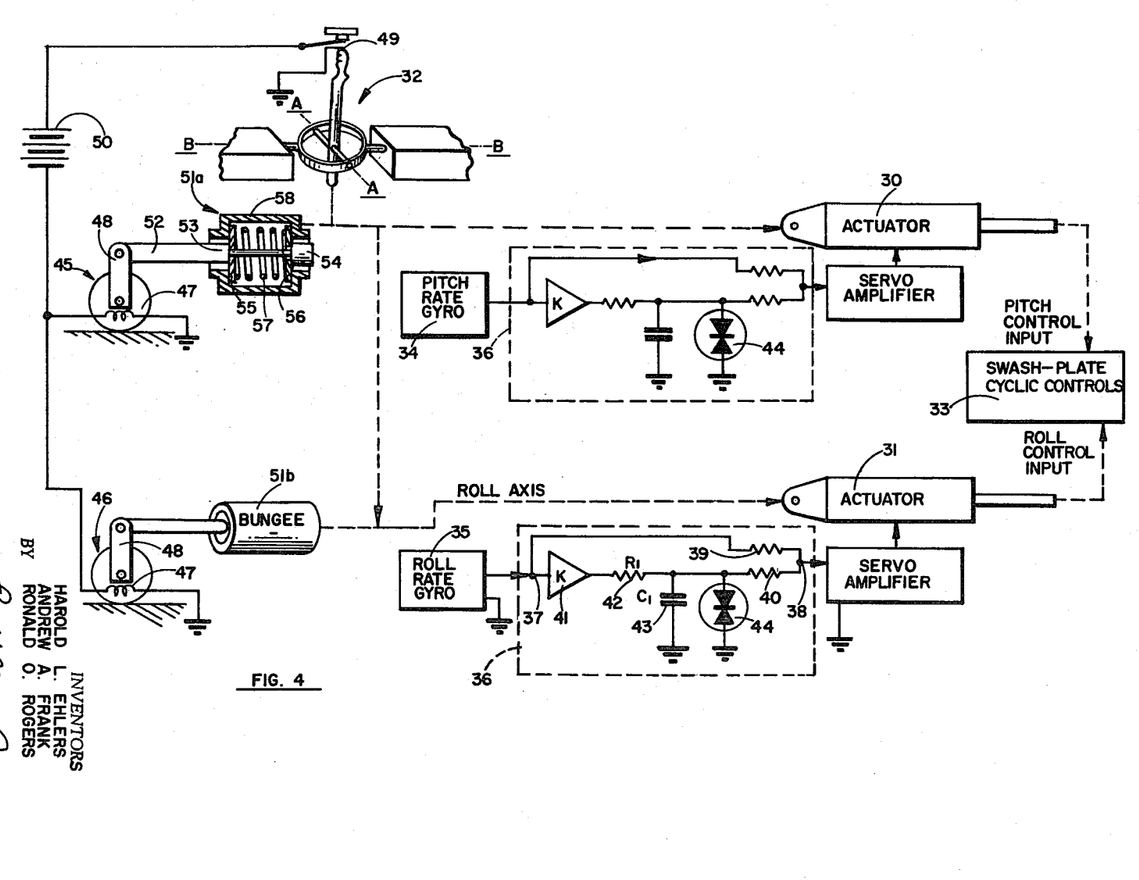
FIG. 4 is an exemplary embodiment of a two-axis helicopter flight stabilizer employing the concepts of the invention.

An exemplary embodiment of a helicopter flight stabilizer, employing the concepts of the invention, is shown in FIG. 4.

Referring to FIG. 4, there is illustrated an exemplary embodiment of a two-axis helicopter flight stabilizer employing the concepts of the invention. There is provided a pitch and roll series actuator 30 and 31 interposed in series mechanical connection (shown in dotted lines) between a manually operated cyclic control column 32 and the pitch and roll input respectively to the swash plate cyclic controls 33 of a single main rotor type helicopter. Such actuators may be comprised of screw-jack motors or other electromechanical devices well-known in the art for providing a mechanical motion (e.g., change in dimension of an extensible link) in response to an electrical input signal. The authority of maximum range of displacements available from such actuators is selected to be substantially less than the full authority of both of the swash plate controls and the cyclic control column (as measured at the swash plate controls) for reasons which will be more fully explained hereinafter.

There is also provided a first and second source 34 and 35 of rate signals indicative of pitch rate and roll rate respectively of a helicopter. Such sources may be comprised, for example, of first and second conventional rate gyros so oriented with respect to the vehicle as to provide angular rate signals indicative of vehicle pitch rate and roll rate respectively.

The electrical output signals from the pitch rate and roll rate signal sources 34 and 35 are fed to the pitch and roll actuators 30 and 31 respectively. A lag-lead circuit or network 36 is interposed between the electrical input to each of actuators 30 and 31 and an asociated one of angular rate signal sources 34 and 35, each such lag-lead network having a lag time constant of at least ten seconds and a lead time constant having a magnitude of no more than one-sixth that of the lag time constant in order that the attitude stabilization of the vehicle may be substantially increased, whereby the vehicle handling characteristics are improved and pilot fatigue is reduced. Each such lag-lead network may be comprised, for example, of an input terminal 37, an output terminal 38, and a common input-output terminal or ground connection, with circuit interconnections as shown in FIG. 4, comprising means for adding a first signal and a second signal which represents an amplified and time-lagged version of the first signal. There is provided a summing network having at least first and second summing resistors 39 and 40, each resistor having one of its two terminals connected to output terminal 38 of the lag-lead network, the other terminal of the first resistor 39 being connected to input terminal 37 of the lag-lead network. There is further provided a D.-C. amplifier 41 having an input responsively connected to input terminal 37 of lead-lag network 36, a series resistor 42 interconnecting the output of amplifier 41 with the other terminal of second summing resistor 40, and a shunt capacitor 43 connected across said other terminal of second summing resistor 40 and the common ground terminal of the lag-lead network.

That the circuit combination of element 36 behaves in the manner of a lag-lead circuit is to be appreciated from the fact that at low frequencies the high gain of amplifier 41 provides a high level lag signal at the input to summing point 38, while at high frequencies the amplitude of the lag signal is so attenuated relative to the input at summing resistor 39 that the composite signal at summing point 38 appears to be restored to zero phase shift relative to the input signal at input terminal 37. Such lag-lead characteristic may also be seen by an analytical treatment of circuit 36 illustrated in FIG. 4. Designating the output voltage at terminal 38 as $e_o$ and the input voltage at terminal 37 as $e_i$, the output $e_o$ may be expressed in terms of the input $e_i$ in Laplace notation as follows:

$$e_o = e_i + e_i K \frac{\frac{1}{C_1 s}}{R_1 + \frac{1}{C_1 s}} \quad (1)$$

where $s$ is the Laplace operator.

Solving for the transfer function, $$\frac{e_o}{e_i}(s)$$

$$\frac{e_o}{e_i}(s) = 1 + \frac{K}{R_1 C_1 s + 1} = \frac{R_1 C_1 s + 1 + K}{R_1 C_1 s + 1} \quad (2)$$

$$\frac{e_o}{e_i}(s) = (K+1) \frac{\left[\left(\frac{R_1 C_2}{K+1}\right)S + 1\right]}{R_1 C_1 s + 1} \quad (3)$$

$$\frac{e_o}{e_i}(s) = K_1 \left(\frac{T_2 s + 1}{T_1 s + 1}\right) \quad (4)$$

where:

$T_1 = R_1 C_1$ $T_2 = \frac{T_1}{K+1} < T_1$ $K_1 = K+1$

Hence, it is to be seen that the lag time constant $T_1$ is determined by $R_1$ and $C_1$, represented by elements 42 and 43 respectively of FIG. 4; and that the lead time constant $T_2$ is inherently less than $T_1$ for any finite value of K, and is determined by both $T_1$ and K, where K is the gain of amplifier 41. Such a result assumes that the resistances of summing resistors 39 and 40 are equal. Exemplary circuit values which have been employed to obtain the desired values, $T_1 = 10$ seconds, $$\frac{T_2}{T_1} = \frac{1}{6}$$

are as follows:

$C_1 = 100$ μfds.
$R_1 = 100,000$ ohms
$K \cong 5$ volts/volt

Included in the lag-lead network 36 of FIG. 4 is a bipolar limiting circuit connected across the lagged signal output component of the signal output from network 36, for reasons which will be more fully explained hereinafter. The value or level of such signal limiting is selected to represent one-half the authority of the associated one of actuators 30 and 31.

Such bi-polar limiting circuit is comprised of a double anode zener diode 44 connected across shunt capacitor 43. The desired limiting value is achieved by proper selection of the commercially available double-anode zener diode employed. While the limiter circuit shown has been described and illustrated as a double-anode zener diode, any equivalent means well-known in the art may be employed to achieve such double-valued signal limiting function.

There is further provided a first and second electromechanical clutch assembly 45 and 46 (mounted in fixed relation to the helicopter and shown in a de-energized condition) in mechanical cooperation with the cyclic control column 32 for providing a pitch and roll position reference respectively for the swash plate controls 33. Such clutch assemblies being comprised of an electromagnetic winding 47, rotatable member 48 which is preloaded to prevent rotation about a single reference axis relative to the clutch assembly, are well-known in the art and are therefore shown in schematic form only in FIG. 4. Such electromechanical clutch or brake may be similar to model FFRB-960-1B manufactured by General Electromechanical Corporation of New Jersey, for example. In normal operation, when the electromagnetic winding 47 is energized, the resulting magnetomotive force substantially overcomes the preload upon the rotatable member, whereby the member is freely movable about the reference axis relative to the clutch assembly; when the windings are de-energized, the member is again fixed relative to the assembly. Windings 47 of clutch assemblies 45 and 46 are electrically connected in parallel, and are commonly operated by means of a push button trim switch 49 connected in series circuit with potential source 50 and windings 47. It is to be appreciated that should an electrical failure occur to a clutch assembly, the back-up platform provided to an associated servo actuator by the combination of a given clutch (and bungee 51, to be described hereinafter) would be preserved, and only the ability to adjust the reference position of the back-up platform would be compromised by such failure.

There is also provided a first and second double-acting preloaded bungee 51a and 51b interposed in series mechanical circuit between cyclic control column 32 and first and second clutch 45 and 46 respectively. The two bungees are identical in construction. Such bungees are well-known in the art as position-to-force transducers and as means for providing a double-acting preload force. Such a device may be comprised of a rigid longitudinal member 52 having a first and second shoulder 53 and 54 mutually spaced thereupon longitudinally, for longitudinally restricting a first and second slidably mounted disks or spring-restraining members 55 and 56 mounted therebetween. Helical spring 57, slidably mounted upon member 52 between disks 55 and 56, is maintained under compression by means of the cooperation of disks 55 and 56 and shoulders 53 and 54, the longitudinal dimension between shoulders 53 and 54 being less than the unrestrained longitudinal dimension of spring 57 and the outside diameter of disks 55 and 56 being greater than the diameter of helical spring 57. A rigid outer case 58 is slidably mounted upon and encloses the spring-loaded disks 55 and 56, and provides a longitudinal restraint by means of its interior longitudinal dimension. Such interior longitudinal dimension of case 58 is preferable equal to the longitudinal dimension between shoulders 53 and 54. One end of bungee assembly 51a is mechanically connected by means of longitudinal member 52 to clutch assembly 45 which provides a fixed reference position, and the other end is mechanically connected by means of case 58 and suitable mechanical connections shown in dotted lines to cyclic control column 32 or a mechanical input source. Bungee 51b is similarly constructed and arranged to connect clutch assembly 46.

The cyclic control column 32 is gimbal mounted for universal pivotal motion. Component motion of column 32 about axis A—A will effect motion of bungee case 58 right or left (as illustrated in FIG. 4), while component motion of column 32 about axis B—B will effect motion of the case of bungee 51b right or left (as illustrated in FIG. 4).

In attempting to operationally move control column 32 relative to the position reference provided by, say, clutch 45, a stick force must be applied to control column 32 which is great enough to overcome the compressive preload of spring 57, and further compress spring 57. For example, motion of case 58 to the right (as illustrated in FIG. 4) requires application of a stick force to the right which is great enough to cause case 58 to move the first disk or left spring-restraining member 55 to the right, further compressing spring 57 against second disk 56 (which is restrained relative to member 52 by means of shoulder 54). Motion of case 58 to the left of the zero stick force position requires a stick force to the left which is great enough to cause case 58 to move second disk or right spring restraining member 56 to move to the left, further compressing spring 57 against first disk 55 (which is restrained by shoulder 53). Hence, motion of the cyclic control column requires a minimum break-out force equal to the preload force of the bungee, plus an additional force increment which is a function of the spring constant (e.g., control column displacement). In this way, the cyclic control column is spring-restrained against motion relative to member 48 of the clutch assembly (when the clutch assembly is in the de-energized condition).

The break-out force magnitude is selected to be greater than the required swash plate actuating force provided by extensible actuator 30 or 31, in order to provide a back-up platform to mechanically support the actuator in its operation of the swash plate controls. The mechanical advantage or linkage between the control column 32 and a bungee 51, however, is selected to assure that the break-out force is within the capability of a human pilot to manually operate the control column, the force gradient provided by the bungee spring constant providing an element of artificial feel for improved manual flying or handling qualities.

In operation of the device of FIG. 4, three modes or functions are provided: two axis stability augmentation about the pitch and roll axes; manual control by means of overriding the stability augmentation function, and manual trimming.

In the first function, the angular-rate signals from each of rate gyros 34 and 35 are shaped by means of lag-lead network 36 and fed to an associated one of extensible-link servo-actuators 30 and 31. Each of extensible links 30 and 31 operates against the preload of an associated bungee 51 to vary the mechanical input to the swash plate controls 33. The resulting response of the swash plate controls provides increased damping of pitch and roll disturbances in straight and level flight, requiring less pilot effort to control the vehicle, whereby the handling qualities of the vehicle are much improved.

The second function or manual control mode, operates in series with the extensible link actuator, essentially varying the position of the actuator back-up platform, whereby the input to the swash plate controls represents the sum of the control column motion and extensible link actuator displacement.

Because the signals from the rate gyros tend to cause actuator motion which compensates for or resists helicopter angular rate increments induced by control column position or motion, the performance of pilot-induced maneuvers requires that the control column be moved from the trim position by an amount in excess of the authority or limit of the actuator motion during the performance of such maneuver. In this way, the manual control mode overrides the automatic control mode for the short time duration required for a maneuver. Because of the short time required for a maneuver, the saturated effect upon the automatic flight stabilization mode is not objectionable. Further, for small control inputs the increased stick deflection or bias required to override the automatic mode makes the manual control mode appear less sensitive to pilots of little experience, and therefore represents an improvement in the handling qualities of the helicopter.

The effect of the attitude-rate stabilization in opposing a gust input or atmospheric anomaly encountered during straight and level flight (e.g., non-maneuvering flight) causes an attitude-rate transient which allows subsidence upon a different probable heading attitude. Because of the large time constant of the R-C lag combination in network 36 (i.e., the large value of C, for capacitor 43), capacitor 43 acts in the manner of an integrator. This integrating action of capacitor 43 tends to restore the vehicle to an original heading attitude upon such subsidence. However, in a maneuver such integrating action of capacitor 43 tends to build up an increasing charge indicative of the time integral of the constant angular rate of the maneuver. If such charge cannot be avoided or reduced, then upon completion of the maneuver, such charge on capacitor 43 would represent a large, although slowly decaying, bias signal component which would possibly continue to saturate the actuator during straight and level flight immediately subsequent to the maneuver, and at least bias the stabilization signals until the bias had decayed.

Such bias effect is substantially reduced and effectively minimized to a tolerable amount by the action of the limiter circuit elements connected across shunt capacitor 43. Hence, the total charge or stored voltage built up on capacitor 43 during a maneuver is limited to an amount corresponding to one-half the authority of an associated one of actuators 30 and 31. In this way, the time interval required to discharge the bias on the capacitor to a given tolerance value is reduced, and the input to the actuator is synchronized with the rate signal appearing at summing resistor 39, which rate signal requires to be equalized. In this way, the lag-circuit in shunt or summed with the resistive input circuit of network 36 is enabled to perform its intended function more effectively and sooner upon the termination of a maneuver.

The third function, control of the manual trim or zero-force position of the control column (e.g., the reference position of the actuator back-up platform) is accomplished in the manner described in connection with the description of the cooperation of the clutches 48 and trim switch 49. In normal operation, the de-energized condition of each clutch assembly provides a fixed mechanical reference or back-up platform for an associated extensible link actuator. When trim button 49 is actuated, thereby energizing coils 47 of clutches 45 and 46, the clutches no longer restrain member 48, and the back-up platform or mechanical reference is removed. While the trim button is so actuated or depressed, the pilot may then adjust the control column (and hence the mechanically interconnected member 48 of each clutch) to a desired trim position, and then release the trim button 49, thereby de-energizing the clutches and restoring the back-up platform at the desired mechanical reference or trim position.

Figure 5:
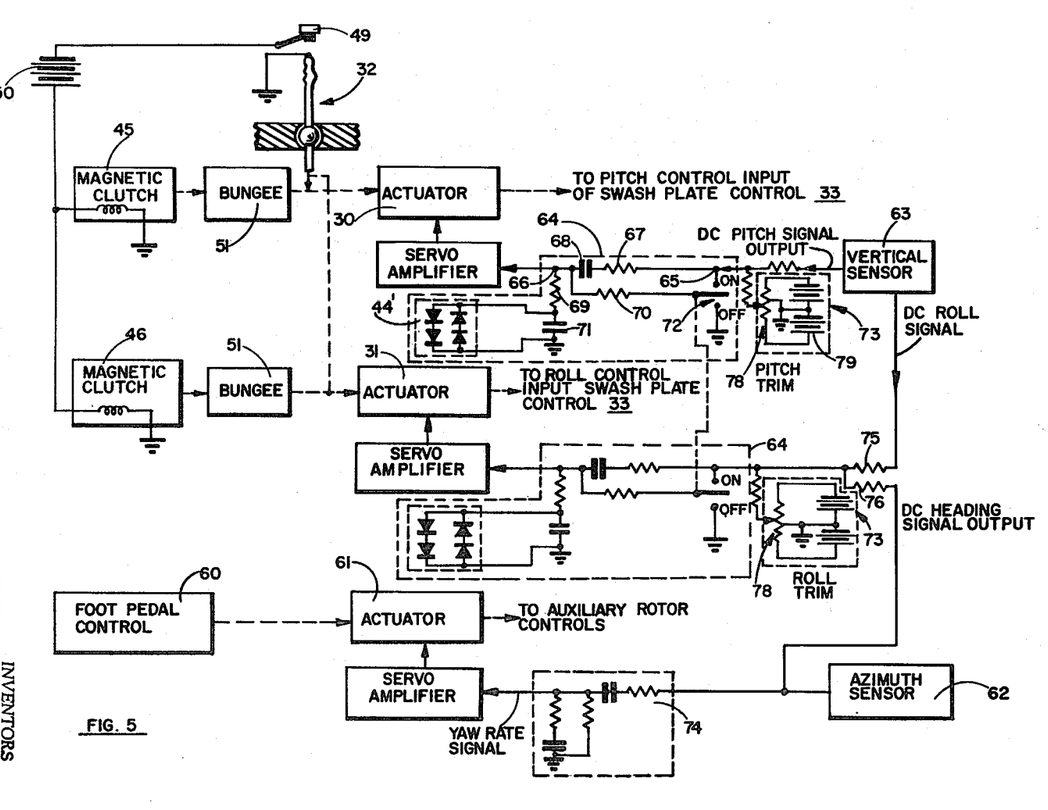
FIG. 5 is a preferred embodiment of a three-axis helicopter attitude controller employing the concepts of the invention.

The basic improved stabilization and manual control system of FIG. 4 may be employed to provide an improved three-axis helicopter attitude controller, as shown in FIG. 5.

Referring to FIG. 5 there is illustrated a preferred embodiment of a three-axis helicopter flight control system employing the concepts of the invention. There is provided pitch and roll series actuators 30 and 31, cyclic control column 32 having a trim switch 49, first and second electromechanical clutches 45 and 46 each with an associated bungee 51, all constructed and arranged substantially as like referenced elements of FIG. 4. In addition there are provided foot pedal controls 60 adapted for operating the auxiliary rotor controls of a helicopter, and a servo actuator system 61 interposed in series mechanical circuit between the output of said foot pedal controls and the input to the auxiliary rotor controls. Foot pedal controls 60 are part of the usual equipment furnished with commercially available helicopter and constitute no novel aspect of the subject invention; therefore, such element is shown in block diagram form only.

There is further provided an azimuth sensor 62 oriented relative to the helicopter flight reference line (FRL) for providing a D.C. signal indicative of the deviation of the FRL from a desired heading reference; and a gimballed vertical sensor 63 having its gimbal axes oriented relative to the helicopter flight reference line to provide a first and second D.C. signal indicative of the pitch and roll attitude respectively of the helicopter. Such devices are well-known in the art, being commercially available; and are, therefore, shown in block form only.

The pitch and roll output of vertical sensor 63 are fed to the pitch and roll actuators 30 and 31 respectively. Interposed between each said output and an associated servo actuator system is a controller network 64 for providing compensated attitude rate stabilization and additionally providing, at the election of the pilot, attitude control.

Such controller network may be comprised, for example of an input terminal 65, an output terminal 66, and a common input-output terminal or ground connection, with circuit interconnections as shown in FIG. 5. Such interconnections comprise: means for differentiating and lagging an input signal, and alternative means including said first means for adding said input signal to said differentiated input signal and commonly lagging both said signals. There is provided a differentiator circuit comprised of a first resistor 67 and first capacitor 68 connected in series circuit between input terminal 65 and output terminal 66. There is further provided a second and third resistor 69 and 70 each having one of its two terminals connected to output terminal 66. A second capacitor 71 is connected between the other terminal of second resistor 69 and the common ground terminal of network 64. There is further provided a double throw switch 72, having one of its two poles connected to input terminal 65 and the other pole connected to common ground. The second terminal of third resistor 70 is connected to the armature of switch 72, whereby such second terminal of third resistor 70 may be alternatively connected to input terminal 65 ("on" position of switch 72) or the common ground terminal of network 64 ("off" position of switch 72).

In the "off" position of switch 72 the resulting interconnection of elements 67, 68, 69, 70 and 71 forms a lag-lead network having an inherent washout feature. First capacitor 68 and grounded third resistor 70 contribute a phase-lead or differentiation effect to an input signal, while second capacitor 71 and second resistor 69 contribute a lag effect. By properly selecting the circuit values to achieve a specified lag time constant $T_1$ which is larger than the largest lead time constant $T_2$ (e.g., $T_1 \geq 10$ seconds and $$\frac{T_2}{T_1} \leq \frac{1}{6}$$

the desired attitude rate stabilization of the helicopter can be performed, as in the operation of the system of FIG. 4. First capacitor 68, being in series connection between the attitude signal input from the attitude sensor and shunt circuit elements 69, 70 and 71, provides a washout signal effect, whereby the circuit is not responsive to steady-state attitude signals, but is responsive only to changes in attitude when switch 72 is in the "off" position.

When switch 72 is in the "on" position, third resistor 70 is connected across input terminal 65 and output terminal 66 of network 64, whereby the washout feature is removed and attitude control is superimposed on the attitude-rate stabilization function to provide a so-called autocruise mode.

Exemplary circuit values which have been employed to obtain the desired time constants are as follows:

$R_1 = 28,700$ ohms
$R_2 = 11,000$ ohms
$R_3 = 42,000$ ohms
$C_1 = 12$ μfds.
$C_2 = 130$ μfds.

Included in the network 64 of FIG. 5 is a bi-polar limiting circuit 44' connected across second capacitor 71 for like reasons as the bi-polar signal limiting elements connected across capacitor 43 of FIG. 4. Such bi-polar limiting device 44' is illustrated as two series strings of like-poled semiconductors or diodes connected across capacitor, each string being oppositely poled relative to the other. The desired limiting value is achieved by increasing or decreasing the number of diodes in each string. It is to be understood, however, that any equivalent signal-limiting means well-known to those skilled in the art may be employed in lieu of the detail circuit element 44' illustrated.

There is further provided for each of the outputs from vertical sensor 63 a D.-C. trim signal means 73 for providing an adjustable bias signal having a desired sense and magnitude, in accordance with structural means well-known in the art. An exemplary embodiment of such device, as illustrated in FIG. 5, may be comprised of a centertapped potentiometer 78 connected across the terminals of centertapped battery 79, the centertaps of potentiometer 78 and battery 79 being commonly connected to the common input-output terminal or ground terminal of network 64. The wiper arm of potentiometer 78 is connected to input terminal 65 of network 64.

The output from azimuth sensor 62 is fed to inputs of both the controller network 64 in the roll channel and the auxiliary rotor control servo actuator system 61. Interposed between actuator 61 and azimuth sensor 62 is differentiating or washout network 74 for providing a signal indicative of the rate of change of yaw. Such signal is intended to provide yaw rate damping or augmentation of the vehicle's attitude stability in azimuth. It has been discovered that the dynamics of a helicopter's heading repose to the auxiliary rotor controls does not appear to be so criticial as to require special signal-shaping of a heading rate signal in order to achieve improved damping. Accordingly, the signal-damaging characteristic of yaw rate signal network 74 is not critical, a lagged differentiator configuration similar to that of network 64 (in the "off" condition) being illustrated.

The D.-C. output of yaw sensor 62 is also fed to network 64 of the flight controller roll channel, the yaw signal being combined with the D.-C. roll signal from sensor 63 by means of summing resistors 75 and 76 respectively. Hence, the operation of actuator 31 in response to the input thereto provides roll stabilization, roll attitude control, and yaw attitude control. In forward flight of the helicoper, a lateral component of the main rotor lift vector, due to a slight roll trim angle, in combination with the forward velocity component caused by a slight pitch trim angle, will result in a yawing velocity or turning flight path. Hence, the trim signal device 73 employed in combination with the D.-C. roll output from vertical sensor 63 is manually adjusted by adjustment of the wiper arm of potentiometer 78 in flight to achieve a zero turning rate when the craft is flying at the desired azimuth or heading set into azimuth sensor 62. Then, any difference between the roll angle signal from sensor 63 and the associated trim signal device 73 will provide an effective turn rate damping effect to damp azimuth errors indicated by the output from azimuth sensor 62.

In hovering flight, the system is switched from the autocruise mode by placing switch 72 in the "off" position, whereby attitude stabilization function is accomplished about the trim attitude. The helicopter's forward velocity is adjusted to zero, by nominal adjustment of the pitch trim device 73 associated with the pitch output from vertical sensor 63 and manual monitoring by means of control column 32. The lateral translation or sidewise motion of the vehicle is controlled in a similar manner. However, yawing of the aircraft in azimuth about the main rotor axis is controlled by the yaw rate signal fed from network 74 to actuator 61, the foot pedal controls 60 being employed as desired for effecting a spin or desired change in azimuth.

An embodiment of the concept of the invention has been incorporated in and observed to successfully control the following types and styles of helicopters: model H–19D manufactured by Sikorsky; models HTL–7, H47–J, H47–J2, H47–G and HUL manufactured by Bell Aircraft Co.; and models 12E, 13E4 and 1110 manufactured by Hiller Helicopter Co. Hence, it is to be appreciated by those skilled in the art that the system of FIGS. 4 and 5 provide simple yet effective means for reducing pilot effort and skill required in control of a single-main-rotor type helicopter.

While the devices of FIGS 4 and 5 have been described and illustrated in terms of a D.-C. operated device, it is clear that well-known equivalent A.-C. means could be employed by those skilled in the art. Means for converting an A.-C. sensor signal to D.-C. for signal shaping by D.-C. network 36 and conversion back to A.-C. for operation of an A.-C. servo is described, for example, in copending U.S. patent application, Serial No. 162,660, filed December 28, 1961, assigned to North American Aviation, Inc., assignee of the subject application.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A flight control system for a helicopter having a single main rotor, swash plate, cyclic control and a manually operable cyclic control column comprising: a pitch and a roll series actuator each interposed in series mechanical connection between the cycle control column and the swash plate cyclic controls, a first and second source of rate signals indicative of pitch rate and roll rate respectively of said helicopter, said first and second signal source being operatively connected to said pitch and roll rate actuators respectively; a lag-lead network interposed between the input to each said actuator and the associated one of said rate signal sources, each said lag-lead network a lag time constant of at least 10 seconds and a lead time constant having a magnitude no more than ⅙ that of the lag time constant.

2. The device of claim 1 in which the authority of said actuators is limited with respect to both the cycle control column and the swash plate cyclic controls of said helicopter, the device of claim 1 further comprising signal limiting means for limiting the lagged output component from each said network while providing synchronization of each of said actuators with the output from an associated one of said signal sources.

3. The device of claim 2 additionally comprising: a first and second electromechanical clutch assembly in cooperation with said cyclic control column for providing a pitch and roll position reference respectively for said swash plate cyclic controls; a first and second double-acting preloaded bungee, interposed between said cyclic control column and said first and second clutch respectively, the double-acting preload force of each said bungee being greater than the force required for actuation of the swash plate cyclic controls.

4. The device of claim 3 additionally comprising a push button type trim switch connected in series electrical circuit with said first and second electromechanical clutch.

5. A three-axis attitude control system for a helicopter having a single main motor, swash plate cyclic controls, and a manually-operable cyclic control column, comprising: a pitch and a roll actuator each interposed in series mechanical connection between the cyclic control column and the swash plate cyclic controls; a vertical sensor having a pitch and a roll output for providing pitch and roll signals indicative of the pitch and roll attitude respectively of said helicopter; a directional sensor for providing heading signals indicative of the azimuth heading of said helicopter; signal summing means; first and second rate signal deriving means responsively connected to the pitch output of said vertical sensor and said signal summing means respectively; first and second lag-lead circuits comprising said first and second rate signal deriving means respectively, each said circuit having a lag time constant of at least 10 seconds and a lead time constant having a magnitude no more than ⅙ that of the lag time constant; said signal summing means being responsively connected to said roll output of said vertical sensor and said directional sensor; said pitch and roll actuators being responsively connected to said first and second lag-lead circuits respectively.

6. A three-axis attitude control system for a helicopter having a single main rotor, swash plate cyclic controls, and a manually-operable cyclic control column, comprising: a pitch and a roll actuator interposed in series mechanical connection between the cyclic control column and the swash plate cyclic controls; a vertical sensor having a pitch and a roll output for providing pitch and roll signals indicative of the pitch and roll attitude respectively of said helicopter; a directional sensor for providing heading signals indicative of the azimuth heading of said helicopter; a first controller network responsively connected to the pitch output of said vertical sensor; a second controller network responsively connected to said directional sensor and the roll output of said vertical sensor; said networks each having a lag time constant of at least 10 seconds and a lead time constant having a magnitude no more than ⅙ that of the lag time constant; each said network being comprised of an input terminal, an output terminal, and a common input-output terminal; a first resistor and first capacitor connected in series circuit between said input and output terminals of said network; a second and third resistor each having one of its two terminals commonly connected to said output terminal of said network; a second capacitor connected between the other terminal of said second resistor and said common input-output terminal of said network; and a double-throw switch having a first and second pole connected to said input terminal and said common input-output terminal respectively of said network, and having an armature connected to the other terminal of said third resistor, said pitch and roll actuators being responsively connected to the output of said first and second control networks respectively.

7. The device of claim 6 in which the authority of said actuators is limted with respect to both the cyclic control column and the swash plate of said helicopter, the device of claim 6 further comprising signal limiting means for limiting the lagged output component from each said network while providing synchronization of an associated one of said actuators.

8. A three-axis attitude control system for a helicopter having a single main rotor, swash plate, and a manually operable cyclic control column comprising: a pitch and a roll actuator interposed in series mechanical connection between the cyclic control column and the swash plate cyclic controls, the authority of said actuators being limited relative to both the cyclic control column and the swash plate cyclic controls; a vertical sensor having a pitch and a roll output for providing pitch and roll signals indicative of the pitch and roll attitude respectively of said helicopter; a directional sensor for providing heading signsnal indicative of the azimuth heading of said helicopter; a first controller network responsively connected to the pitch output of said vertical sensor; a second controller network responsively connected to said directional sensor and the roll output of said vertical sensor; said networks each having a lag time constant of at least 10 seconds and a lead time constant having a magnitude no more than ⅙ that of the lag time constant; each said network being comprised of an input terminal, an output terminal, and a common input-output terminal; a first resistor and first capacitor connected in series circuit between said input and output terminals of said network; a second and third resistor each having one of its two termials commonly connected to said output terminal of said network; a second capacitor connected between the other terminal of said second resistor and said common input-output terminal of said network; a double-throw switch having a first and second pole connected to said input terminal and said common input-output terminal respectively of said network, and having an armature connected to the other terminal of said third resitsor; and signal-limiting means connected across said second capacitor for providing a signal limit thereacross which is less than that represented by the authority limit of an associated one of said actuators.

9. The device of claim 8 additionally comprising: a first and second electromechanical clutch assembly in cooperation with said cyclic control column for providing a pitch and roll position reference respectively for said swash plate cyclic controls; and a first and second double-acting preloaded bungee, interposed between said cyclic control column and said first and second clutch respectively, the double-acting preload force of each said bungee being greater than the force required to actuate said swash plate controls.

10. The device of claim 9 additionally comprising a push-button type trim switch adapted to be mounted upon said cyclic control column and being commonly connected in series electrical circuit with said first and second electromechanical clutch.

11. A flight control system for a helicopter having a single main rotor, swash plate, cyclic controls and a manually operable cyclic control column comprising: a pitch and roll series actuator each interposed in series mechanical connection between the cyclic control column and the swash plate cyclic controls, a first and second source of rate signals indicative of pitch rate and roll rate respectively of said helicopter, said first and second signal source being operatively connected to said pitch and roll rate actuators respectively; a lag-lead network interposed between the input to each said actuator and the associated one of said rate signal sources, each said lag-lead network having a lag time constant of at least 10 seconds and a lead time constant having a magnitude no more than 1/6 that of the lag time constant, the authority of said actuators being limited with respect to both the cyclic control column and the swash plate cyclic controls of said helicopter; signal limiting means for limiting the lagged output component from each said network while providing synchronization of each of said actuators with the output from an associated one of said signal sources; each said lag-lead network being comprised of an input terminal, an output terminal, and a common input-output terminal; a summing network having at least a first and second summing resistor each having one of its two terminals commonly connected to said output terminal of said network, the other terminal of said first summing resistor being connected to the input terminal of said network; a D.-C. amplifier having an input responsively connected to said input terminal of said network; a series resistor interconnecting an output of said amplifier and said other terminal of the second summing resistor; a shunt capacitor connected across said other terminal of said second summing resistor and said common terminal of said network; and signal-limiting means connected in parallel across said shunt capacitor.

12. The device of claim 11 in which said signal limiting means comprises a double anode zener diode connected in parallel with said shunt capacitor for providing signal limiting of a lagged signal component of the signal output from said lag-lead network; said signal limit being less than that represented by the limited output of an associated actuator.

References Cited by the Examiner
UNITED STATES PATENTS

| | | | |
|---|---|---|---|
| 2,479,549 | 8/49 | Ayres | 244—17.13 |
| 2,636,699 | 4/53 | Jude | 244—77 |
| 2,998,210 | 8/61 | Carter | 244—17.13 X |
| 3,050,276 | 8/62 | Wissinger | 244—17.13 |
| 3,099,421 | 7/63 | Gerstine | 244—17.13 |

FERGUS S. MIDDLETON, *Primary Examiner.*

MILTON BUCHLER, *Examiner.*

UNITED STATES PATENT OFFICE
CERTIFICATE OF CORRECTION

Patent No. 3,175,786                                          March 30, 1965

Andrew Alfonso Frank et al.

It is hereby certified that error appears in the above numbered patent requiring correction and that the said Letters Patent should read as corrected below.

Column 12, line 35, for "signal-damaging" read -- signal-shaping --; column 13, line 4, for "1110" read -- 1100 --; line 63, for "motor" read -- rotor --; column 14, line 73, for "termials" read -- terminals --.

Signed and sealed this 22nd day of February 1966.

(SEAL)
Attest:

ERNEST W. SWIDER                                    EDWARD J. BRENNER
Attesting Officer                                          Commissioner of Patents